Nov. 17, 1936.                    L. E. LA BRIE                    2,060,874
                                      BRAKE
                            Filed Nov. 15, 1930          3 Sheets-Sheet 1

INVENTOR.
LUDGER E. LA BRIE
BY
ATTORNEY

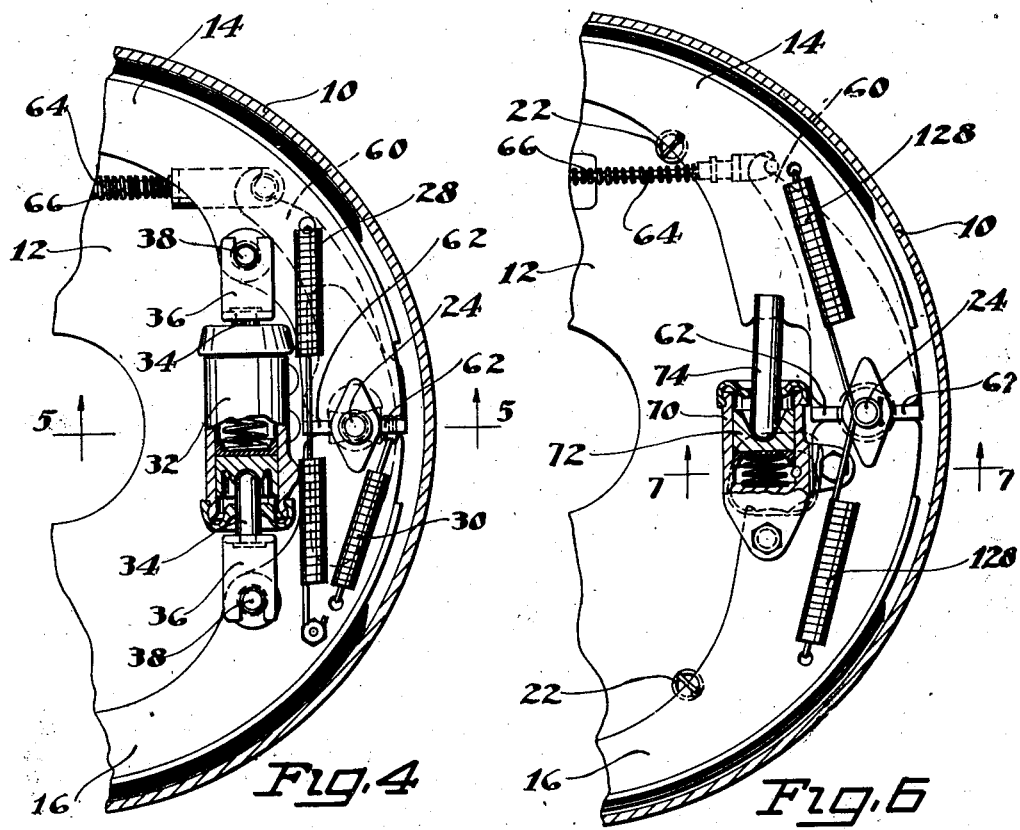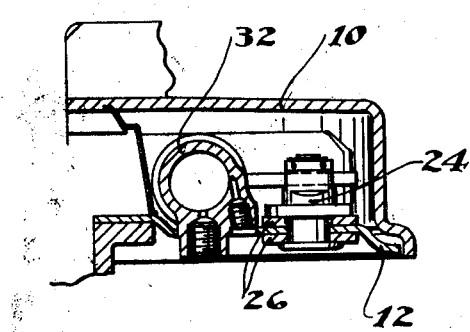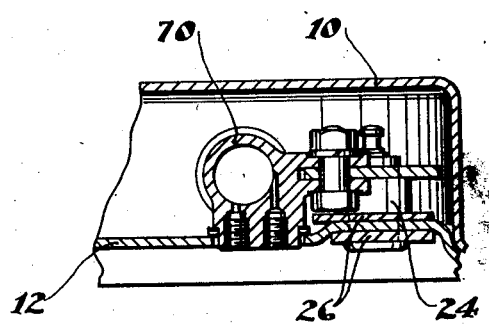

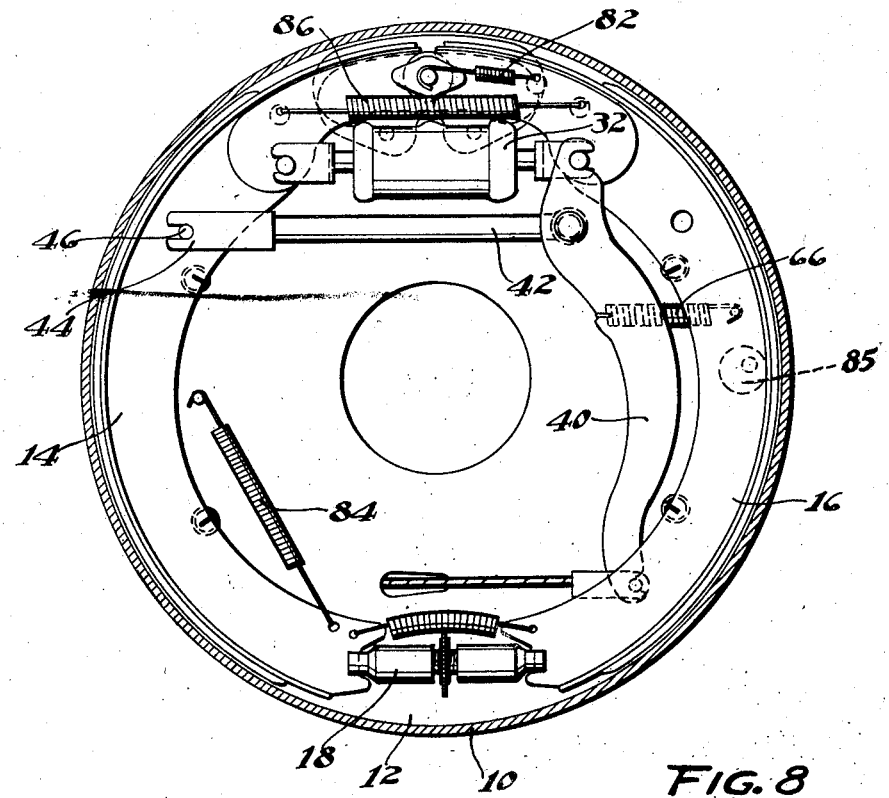
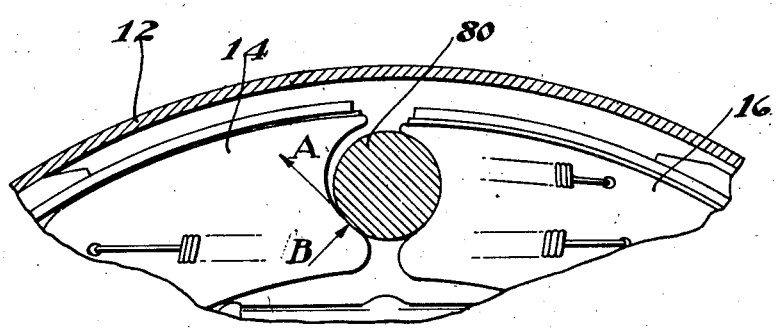

Patented Nov. 17, 1936

2,060,874

UNITED STATES PATENT OFFICE 2,060,874

BRAKE

Ludger E. La Brie, South Bend, Ind., assignor to Bendix Brake Company, South Bend, Ind., a corporation of Illinois Application November 15, 1930, Serial No. 495,809

19 Claims. (Cl. 188—106)

This invention relates to brakes, and is illustrated as embodied in an internal expanding brake of the shiftable-anchorage type. An object of the invention is to provide a simple and effective arrangement, especially useful in a brake of this type, of two alternatively-operable applying devices, one preferably being a fluid-power device and the other preferably a floating lever serving as an emergency-brake connection. A further object of the invention is to provide balanced applying means to thrust apart the ends of this type of brake with equal force, in combination with means for loading the brake elements, constructed and arranged to cooperate with the elements of the brake, the anchor and the applying means in maintaining a constant engagement between the braking elements and the anchor until such time as said elements contact the revolving drum. The undesirable "click" or noise of anchoring is thus avoided. In one desirable arrangement, a fluid motor is arranged to force the braking elements apart with equal force, the return springs of the brake being constructed and arranged to maintain the elements in anchor engagement until drum contact is effected irrespective of the direction of drum rotation.

Other features relate to the structure and arrangement of the fluid-power device, and of the floating lever, together with other novel and desirable constructions which will be apparent from the following description of the illustrative embodiments shown in the accompanying drawings, in which:.

Figure 4 is a partial section corresponding to Figure 1, but showing a different arrangement of the applying devices;

Figure 5 is a partial section on the line 5—5 of Figure 4, showing the anchorage;

Figure 6 is a partial section corresponding to Figures 1 and 4, but showing a third arrangement of the applying devices;

Figure 7 is a partial section on the line 7—7 of Figure 6, showing the anchorage of this third brake;

Figure 8 is a view similar to Figure 1 showing a modified form of brake construction; and Figure 9 is a fragmentary view disclosing the relative position of the anchor member and left shoe of the brake of Figure 8 during the lining clearance take-up movement of the brake.

Figure 1:
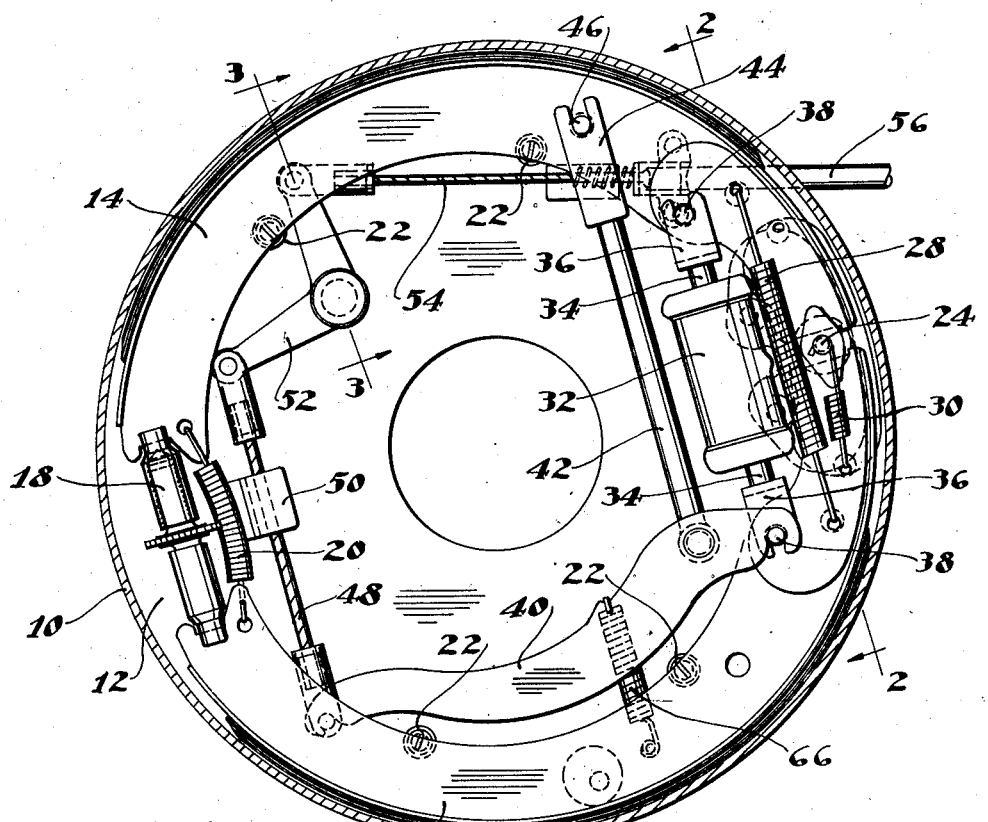
Figure 1 is a vertical section through the brake, just inside the head of the brake drum, and showing the brake shoes in side elevation.
Figure 2:
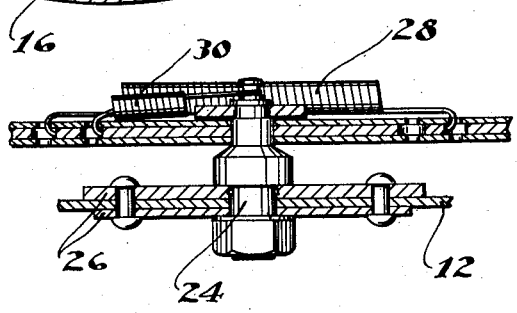
Figure 2 is a partial section on the line 2—2 of Figure 1, showing the brake anchorage.
Figure 3:
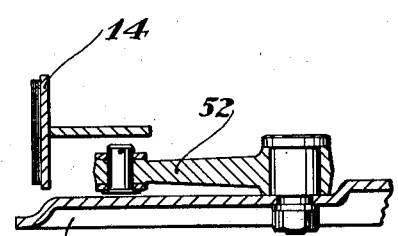
Figure 3 is a partial section on the line 3—3 of Figure 1, showing part of the mechanical applying means.

The brake shown in Figure 1 includes a rotatable drum 10, at the open side of which is arranged a support such as a backing plate 12, and within which is arranged the brake friction means. The latter is illustrated as including a pair of shoes 14 and 16 connected by an adjustable floating joint 18, which in the form shown includes a right-and-left threaded member seated in correspondingly-threaded sockets having slotted bases to embrace the shoe ends. The shoes may be held against the adjustment by a tensioned spring 20. Suitable steady rests 22 may be provided for the shoes.

Preferably a flat-sided anchor 24 is fixedly secured to the backing plate (reinforced if necessary by stampings 26), between the ends of the shoes, the arrangement being such that when the drum is turning clockwise the shoe 14 anchors thereagainst, while if the drum is turning counter-clockwise the shoe 16 anchors thereagainst. A return spring 28 is tensioned between the shoes. An auxiliary return spring 30 may be tensioned between the anchor 24 and the shoe 16, to make sure that the latter shoe (which is the one to anchor when the vehicle is moving forward) will not leave the anchor unless the drum is turning backward and so overcomes this spring.

The brake is intended to be applied by either of two controls, viz. a fluid-power control for service purposes and a mechanical control for emergency and parking purposes. Broadly, this type of combination applying means for a shiftable-anchorage brake is disclosed and claimed in my prior application No. 491,589, filed October 27, 1930.

In the improvement covered by the present application, in the form shown in Figure 1, the fluid-power means includes a hydraulic cylinder 32 secured to the backing-plate and containing a pair of pistons provided with thrust or piston rods 34 having yokes 36 embracing the ends of the shoe webs and slotted for pivotal engagement with cross pins 38 mounted in the shoe webs. The slots in yokes 36 allow the application of the brake by the mechanical (emergency) means without affecting the fluid-power means.

The mechanical means of Figure 1, includes a lever 40 slotted at its end to embrace the lower pin 38, and pivoted to a thrust rod or link 42 having at its upper end a yoke 44 slotted to engage pivotally with a cross pin 46 carried by the web of shoe 14. The slots in lever 40 and yoke 44 allow the application of the brake by the fluid-power means without affecting the mechanical means.

Lever 40 is shown operated by a cable or the like 48, provided if desired with a guide 50 mounted on the backing plate, and connected, through the medium of a bellcrank lever 52 pivoted on the backing plate, with a cable 54 passing through an opening in the backing plate and through a flexible Bowden-type conduit 56. The cable 54 is connected by any suitable means to the handbrake (emergency) lever. Conduit 56 is secured at one end to the backing plate and at its other end to the chassis frame.

In the arrangement of Figures 4 and 5, the fluid power means is substantially as described above. The mechanical means, however, is in the form of a floating lever 60 having thrust projections 62 extending between the shoe ends on opposite sides of the anchor 24. The upper end of the lever is connected to and actuated by a cable 64, shown surrounded by a return spring 66. Cable 64 extends through an opening in the backing plate and through a Bowden conduit, as described for cable 54.

In the arrangement of Figures 6 and 7, the mechanical control is the same as in Figures 4 and 5, but the fluid control includes a hydraulic cylinder 70 bolted rigidly to the web of shoe 16 and containing a single piston 72 pivotally engaged by the rounded end of a thrust or piston rod 74. Rod 74 is slotted across its end to embrace and pivotally engage the end of the web of shoe 14. I have shown in Figure 6 two return springs 128 tensioned between the respective shoes and the anchor 24, the lower spring 128 preferably being stronger than the upper one.

In Figure 8 there is disclosed a structure generally similar to that of Figure 1, with the principal exception of the construction and arrangement of the parts, particularly designed to obviate the objectionable anchoring "click" of the brake. The spaced apart ends of the shoes are preferably recessed to conform to a round anchor member 80, springs 82, 84 and 86 serving to maintain the shoes snugly against the anchor in "brake-off" position.

In operation, the fluid pressure of the motor forces the toe of shoe 14 toward the drum, shoe 16 remaining anchored by virtue of the loading effect of spring 82.

It is of particular significance, that during this lining clearance take-up phase of the brake operation, the lower portion of shoe 14 remains in contact with the anchor as indicated in Figure 9. This is due to the coacting contours of the shoe and anchor as well as the relative strengths and arrangement of the springs 82, 84 and 86. This construction and arrangement of parts is such as to give a substantially radial movement to the shoe 14 in a direction indicated by the arrow A, Figure 9, the direction of thrust of the shoe against the anchor being indicated by the arrow B, which is substantially at right angles with the direction A.

After the shoe is in contact with the clockwise revolving drum, the latter serves to drive the shoe 14 by a wrapping effect into full anchoring engagement and this effect is supplemented by the upward component of the spring 84 and the shoe 14 acting as a lever with its fulcrum at the anchor. The spring 84 also tends to rock shoe 16 about the eccentric stop 85 as a fulcrum which brings the toe of shoe 16 into drum engagement to augment the applying effect of the fluid motor 32 in overcoming springs 82 and 86. The shoe 14 is thus eased into drum engagement without clicking and without at any time leaving the anchor, the shoe 16 being effectively applied to subsequently function as a servo or driving shoe in applying shoe 14 to the drum.

With counterclockwise rotation of the drum, the spring 82 obviates click from the auxiliary shoe 16 by maintaining the shoe anchored during the lining clearance take-up. The shoe 14 in this case is the driving or servo shoe.

While several illustrative embodiments have been described in detail, it is not my intention to limit the scope of the invention to those particular embodiments, or otherwise than by the terms of the appended claims.

The embodiment of my invention shown in Figure 6 is also shown in and is claimed in my copending application Serial No. 691,746. Generic claims and claims specific to Figures 1, 4 and 8 are included herein.

I claim:
1. A brake of the shiftable anchorage type comprising friction means provided with ends, fluid power means for spreading said ends apart, and a single mechanically operated lever formed with lugs contacting directly with the ends of said friction means for alternatively spreading said ends apart.

2. A brake of the shiftable anchorage type comprising friction means provided with ends, fluid power means for spreading said ends apart, and a single floating lever formed with lugs contacting directly with the ends of said friction means for alternatively spreading said ends apart.

3. A brake comprising a drum, in combination with floating friction means having a fixed anchor between its ends, and two applying devices acting to force said ends apart and one of which includes a single floating lever formed with lugs contacting directly with said friction means between the ends of the friction means and the other of which includes a cylinder containing a pair of pistons acting respectively adjacent to said ends.

4. A brake comprising a drum, in combination with friction means anchoring at one end when the drum is turning in one direction and at the other end when the drum is turning in the other direction, a floating lever having thrust parts arranged between said ends, and a fluid-power device adjacent said ends and acting on the friction means near said ends.

5. A brake comprising a drum, in combination with friction means anchoring at one end when the drum is turning in one direction and at the other end when the drum is turning in the other direction, a floating lever having thrust parts arranged between said ends, and a fluid-power device adjacent said ends comprising a wheel cylinder, a pair of pistons in said cylinder, and a pair of piston rods each engaging one of said pistons and each pivotally engaging the friction means near said ends.

6. A brake of the shiftable anchorage type comprising a rotatable drum, an anchor member, friction elements having ends normally contacting said anchor member, means for separating the ends of said elements apart to apply the brake, said means acting with equal force on each of said elements, together with means within the brake and acting upon the friction elements, said means insuring a constant contact of both of said elements and constant anchoring contact of one of said elements during the lining clearance take up phase in the application of the brake.

7. A brake of the shiftable anchorage type comprising a rotatable drum, an anchor member, friction elements having ends normally contacting said anchor member, a fluid motor for separating the ends of said elements apart to apply the brake, said means acting with equal force on each of said elements, together with means within the brake and acting upon the friction elements, said means insuring a constant contact of both of said elements and constant anchoring contact of one of said elements during the lining clearance take up phase in the application of the brake.

8. A brake mechanism comprising friction elements having spaced apart ends, an anchoring member between said spaced apart ends, an applying means associated with said elements for separating said ends, together with means acting on the elements, said latter means being so constructed and so arranged with respect to the afore-mentioned structure as to predetermine a substantially radial movement to at least one of said ends and at the same time maintain said end in contact with said anchor by a thrust in a direction substantially normal to said radial movement while the other end is maintained stationary.

9. A brake comprising a drum in combination with friction means anchoring at one end when the drum is turning in one direction and at the other end when the drum is turning in the other direction, a lever having thrust parts arranged between said ends, a cylinder also between said ends, and a pair of pistons in the cylinder, one acting on the friction means near one of said ends and the other acting on the friction means near the other of said ends.

10. A brake comprising a drum in combination with friction means anchoring at one end when the drum is turning in one direction and at the other end when the drum is turning in the other direction, a floating lever having thrust parts arranged between said ends, a cylinder also between said ends, and a pair of pistons in the cylinder, one acting on the friction means near one of said ends and the other acting on the friction means near the other of said ends.

11. In a braking apparatus, in combination with a drum; a backing plate therefor; an expansible floating friction brake in said drum having adjacent separable free ends; an anchor associated with and arranged adjacent to said ends; hydraulic means arranged adjacent to said ends and engageable with the ends of said brake independently of said anchor for separating said ends to expand the brake into engagement with the drum, said hydraulic means comprising a wheel cylinder, and a pair of pistons in said cylinder, each adapted to exert applying force on said brake; and additional means engageable with said brake for separating said ends, said additional means comprising a floating lever having thrust parts bearing on the ends of said expansible brake independently of both said anchor and said hydraulic means for separating said ends to expand the brake.

12. A brake comprising a drum, in combination with a friction device anchoring at one end when the drum is turning in one direction and at the other end when the drum is turning in the other direction, a floating applying means comprising a lever arranged adjacent to said ends and having thrust parts for separating said ends, another floating applying means comprising a hydraulic cylinder arranged adjacent to said ends, and a pair of floating pistons in said cylinder one arranged adjacent to one of said ends and the other arranged adjacent to the other of said ends and both arranged to separate said ends, said hydraulic applying means and lever applying means being arranged to spread said ends independently of each other.

13. A brake comprising a drum, in combination with friction means anchoring at one end when the drum is turning in one direction and at the other end when the drum is turning in the other direction, a floating lever arranged adjacent to said ends to transmit brake applying thrust to said friction device, a cylinder also arranged adjacent to said ends, and a pair of pistons in said cylinder one acting on the friction means adjacent to one of said ends and the other acting on the friction means adjacent to the other of said ends.

14. In a brake apparatus, the combination of a drum; a backing plate therefor; an expansible brake having adjacent free ends; hydraulic means arranged adjacent to said ends and engageable with said brake for separating said ends to expand the brake into engagement with the drum, said means comprising a wheel cylinder, and a pair of pistons in said cylinder, each adapted to exert applying force on said brake; additional means engageable with said brake for separating said ends, said additional means comprising a floating lever, and a thrust element connected to one of said shoes adjacent to the end thereof and pivotally connected to said floating lever at an intermediate point of the floating lever; and means for pivotally connecting the end of the floating lever to the other shoe adjacent to the end of the shoe and to an end of the lever.

15. In a braking apparatus, the combination of a drum; a backing plate therefor; an expansible brake having adjacent free ends, hydraulic means arranged adjacent to said ends and engageable with said brake for separating said ends to expand the brake into engagement with the drum, said means comprising a wheel cylinder, and a pair of pistons in said cylinder, each adapted to exert applying force on said brake, and additional means engageable with said brake for separating said ends, said means comprising a floating lever, a cable connected to one end of said lever, a conduit connected to said backing plate and inclosing a portion of said cable, a strut link pivotally connected to said lever intermediate its ends and arranged to bear on said brake adjacent one of its ends, and a thrust part including a pivot pin positioned adjacent to the opposite end of said lever for acting on the brake adjacent to the other end of said brake to urge said last named end in a direction opposite to that in which the strut link is adapted to urge the first named end.

16. A brake comprising a drum, in combination with a friction device anchoring at one end when the drum is turning in one direction and at the other end when the drum is turning in the other direction, an anchor arranged adjacent to said ends for taking braking torque from said ends, a floating applying means comprising a floating lever arranged adjacent to said ends and having thrust parts for separating said ends and another floating applying means comprising a hydraulic cylinder arranged adjacent to said ends, a pair of floating pistons in said cylinder one arranged adjacent to one of said ends and the other adjacent to the other of said ends and both arranged to separate said ends, said anchor being arranged to take the braking torque from said ends independently of said applying means and said hydraulic applying means and lever applying means being arranged to act to spread said ends independently of each other.

17. A brake comprising a drum, in combination with a friction device anchoring at one end when the drum is turning in one direction and at the other end when the drum is turning in the other direction, an anchor adjacent to said ends for taking braking torque from said ends, a floating applying means comprising a floating lever arranged adjacent to said ends and having thrust parts for separating said ends and another floating applying means comprising a hydraulic cylinder arranged adjacent to said ends, a pair of floating pistons in said cylinder one arranged adjacent to one of said ends and the other arranged adjacent to the other of said ends and both arranged to separate said ends, said anchor being arranged to take the braking torque from said ends independently of said applying means and said hydraulic applying means and lever applying means being arranged to act to spread said ends independently of each other, a return spring connected to said friction device adjacent to said ends and positioned between said anchor and said cylinder, said lever acting on one end of said friction device in line with the line of thrust of said hydraulic cylinder and said lever acting on the other end of said friction device at a point offset of the said line of thrust of the hydraulic cylinder.

18. A brake comprising a drum, in combination with friction means anchoring at one end when the drum is turning in one direction and at the other end when the drum is turning in the other direction, a floating lever having thrust parts arranged adjacent to said ends for spreading said ends apart to apply the friction means and a fluid power device adjacent said ends and comprising a wheel cylinder, a pair of pistons in said cylinder, and a pair of piston rods each engaging one of said pistons and each arranged to pivotally engage said friction means near to said ends for spreading said ends apart to apply the friction means.

19. A brake comprising a drum, in combination with friction means anchoring at one end when the drum is turning in one direction and at the other end when the drum is turning in the other direction, a floating lever having thrust parts for spreading said ends apart to apply the friction means and a fluid power device adjacent said ends and comprising a wheel cylinder, and a pair of floating thrust parts in said cylinder each arranged to engage said friction means for spreading said ends apart to apply the friction means.

LUDGER E. LA BRIE.